Sept. 15, 1959  B. O. KAPPELMANN  2,903,835
COTTON STRIPPING MACHINE
Filed April 18, 1957  2 Sheets-Sheet 1
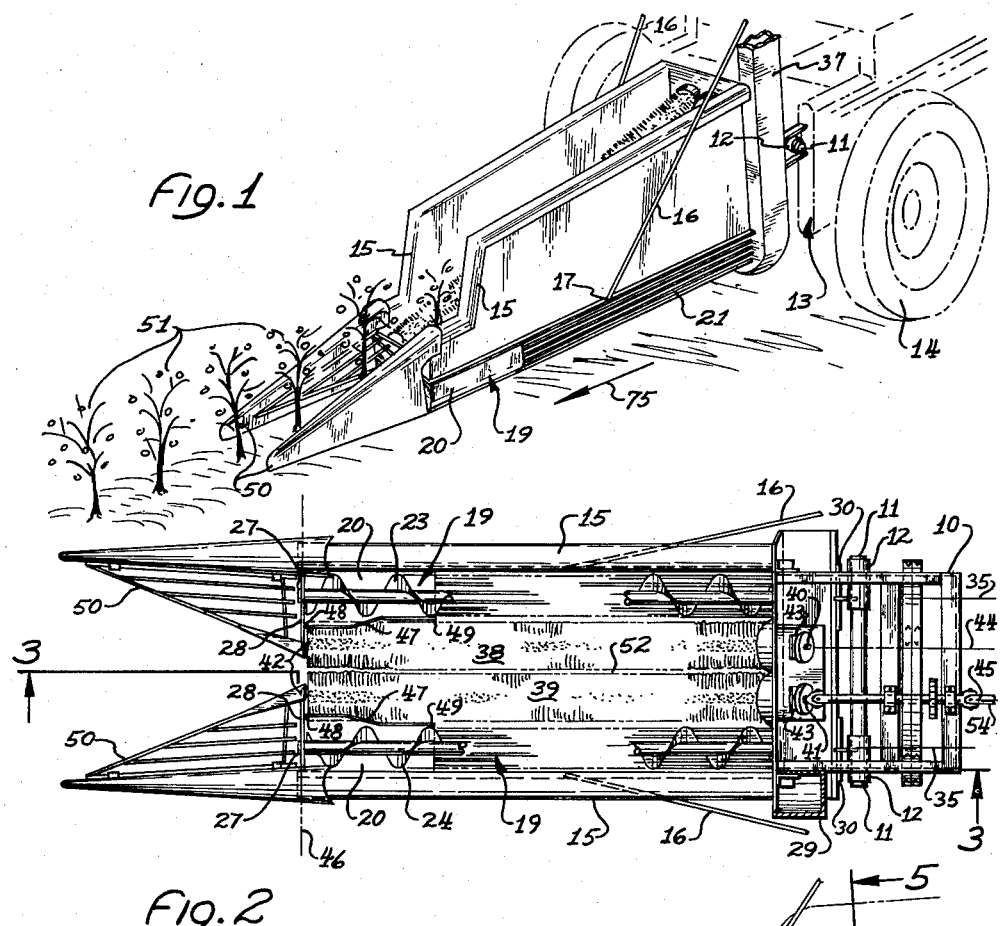
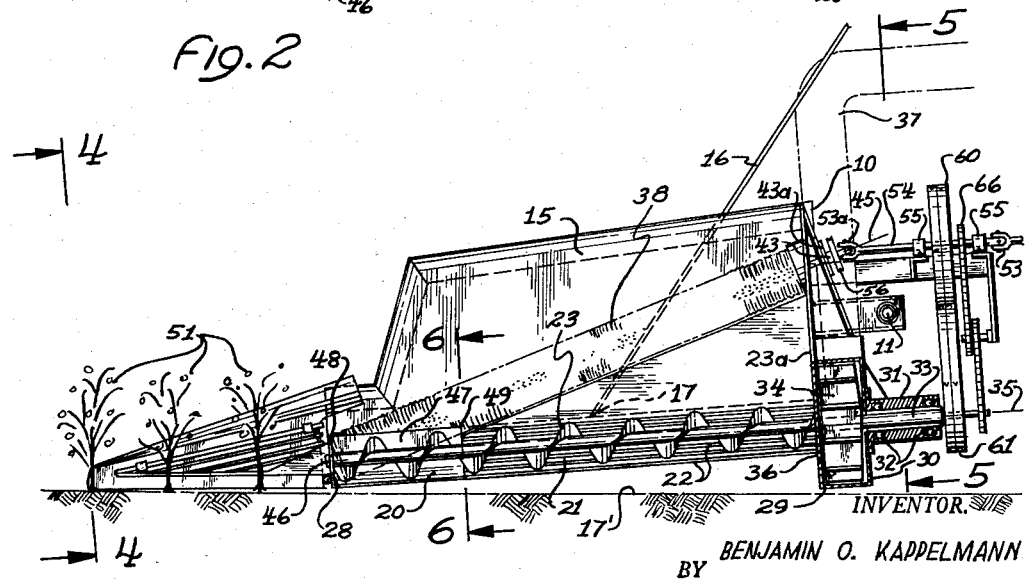
INVENTOR.
BENJAMIN O. KAPPELMANN
BY
Willard S. Grout
ATTORNEY

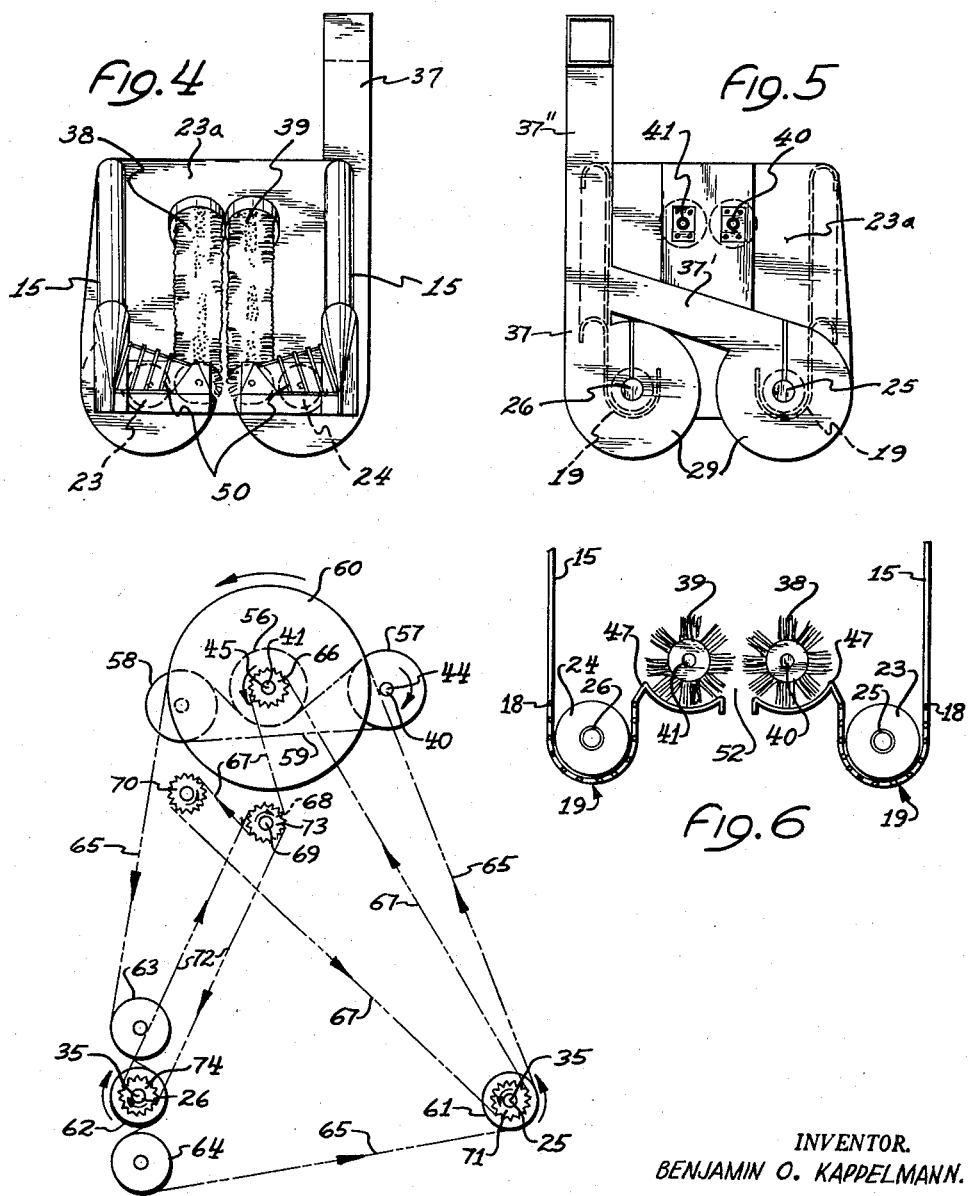

2,903,835
COTTON STRIPPING MACHINE

Benjamin Oscar Kappelmann, Phoenix, Ariz.

Application April 18, 1957, Serial No. 653,635

4 Claims. (Cl. 56—33)

This invention pertains to an improved cotton picking machine.

One of the objects of this invention is to provide a cotton picking machine that is simple in construction and highly efficient in thoroughly picking the cotton from the plant.

Another object of this invention is to provide a cotton picking machine having no reciprocating parts.

Still another object of this invention is to provide a cotton picking machine in which the rotatable screw conveyor receiving the picked cotton is coaxially mounted with the rotatable discharge blower rotor.

A further object of this invention is to provide a cotton picking machine with oppositely rotatable plant engaging brushes upwardly sloping in the direction of plant travel between the brushes to provide the actuable means for stripping the cotton from the bush.

Further features and advantages of this invention will appear from the detailed description of the drawings in which:

Fig. 1 is a general perspective view of a cotton picking machine incorporating the features of this invention.

Fig. 2 is a plan view with parts broken away of the machine shown in Fig. 1.

Fig. 3 is a section on the line 3—3 of Fig. 2.

Fig. 4 is a front end elevation of the machine shown in Fig. 2.

Fig. 5 is a rear end elevation of the machine shown in Fig. 2.

Fig. 6 is an enlarged section on the line 6—6 in Fig. 3.

Fig. 7 is a diagram of the drive train of the machine.

As an example of one embodiment of this invention, there is shown a cotton picking machine comprising a rear end frame 10 having a horizontal pivot bar 11 suitably journaled in bearing members 12 carried on the tractor 13 having the usual driving wheels 14 and engine and steering wheels (not shown). Forwardly extending, symmetrically shaped sides 15 are rigidly fixed to the frame 10 and are engaged by support rods 16 at the points 17, the upper ends of the rods 16 being suitably connected to the usual lifting and positioning mechanism of the tractor 13 (not shown), for the proper positioning of the unit relative to the ground surface 17' by adjustment about the pivot bar 11.

Along the lower edges 18 of each of the sides 15 are provided inwardly positioned troughs 19 having solid U-shaped front end portions 20 and rearwardly open portions 21 formed of a series of parallel rods 22 forming a trash screen terminating at the rear panel 23a of the frame 10. In each of these troughs 19 are carried the screw conveyors 23 and 24 having the respective shafts 25 and 26 suitably journaled at their front ends in suitable bearings 27 carried in the front plates 28 suitably fixed to the sides 15 and the front portions 20 of the troughs 19.

At the rear of the frame are the blower housings 29 formed by the rear panel 23a and the rear covers 30. Support housings 31 are formed integral with the rear covers 30 in which are mounted suitable bearings 32 which in turn rotatively support the hub 33 of the blower rotors 34 in the blower housings 29. The shafts 25 and 26 of the screw conveyors are suitably journaled in the hub 33 of the blower rotors coaxially of the axis of rotation 35 of both the screw conveyors 23 and 24 and the rotors 34. A suction opening 36 formed in the rear panel 23a coaxially of the axis 35 permits the picked cotton being transmitted rearwardly in the troughs 19 to enter the blower housings and to be sucked up by the rotors 34 and discharged out through the discharge pipes 37 and 37' to the common pipe 37" that leads to the usual receptacle on the tractor (not shown).

A pair of oppositely rotating elongated cylindrical picker brushes 38 and 39 are fixed to shafts 40 and 41 respectively, the shafts being journaled in suitable bearings 42 in the front plates 28 and sloping upwardly and rearwardly and journaled in suitable bearings 43 in plates 43a forming an integral part of the frame 10. It will be noted that the axes of rotation 35 of the conveyors 23 and 24 and the axes of rotation 44 and 45 of the brushes 38 and 39 intersect substantially in a transverse horizontal line 46 at the lower forward part of the unit. The solid front end portions 20 of the conveyor have helicoidal stripper edges 47 which start at the front plates 28 at the points 48 and curve rearwardly down under the rotary picker brushes 38 and 39 to the points 49, these edges serving to strip the picked cotton adhering to the brushes between the points 48 and 49 of the solid portion of the conveyor troughs to cause the picked cotton to be properly deposited at the rear ends of the screw conveyors without congestion and clogging resulting. Suitable plant guiding elements 50 may be provided on the front of the unit to assist in directing the cotton plants 51 into the slot 52 defined by the brushes 38 and 39.

Power for rotating the brushes 38 and 39, the conveyors 23 and 24, and the blowers 34 is derived from the usual power take-off of the tractor (not shown) which is connected by a suitable universal joint 53 to drive the power input shaft 54 journaled in suitable bearings 55 carried on the frame 10. The inner end of the shaft 54 is connected through a universal joint 53a to the brush shaft 41. A pulley 56 is fixed on the brush shaft 41 and a similar pulley 57 is fixed on the brush shaft 40 and a suitably adjustable idler pulley 58 is mounted on the frame 10 over which pulleys 56—57—58 operates a belt 59, as shown best in Fig. 7, so that the brush shafts 40 and 41 are simultaneously rotated at substantially the same speed but in opposite direction, the bristles of the brushes traveling upwardly relative to the plants being worked upon at the slot 52 between the brushes.

Fixed on the power input shaft 54 is the large drive pulley 60 and on the hubs 33 of the blower rotors 34 are fixed the small drive pulleys 61 and 62. A pair of suitably adjustable idler pulleys 63 and 64 are mounted on the frame 10 and multiple type drive belts 65 are operatively presented over the pulleys 60—63—62—64—61, as best shown in Fig. 7, so that the blower rotors rotate at high speed but in opposite directions on the bearings 32.

Also fixed on the power input shaft 54 is a sprocket 66 over which operates a roller chain 67 and which chain engages a sprocket 68 fixed to a suitable idler shaft 69 journaled on the frame 10, and then passes over an adjustable idler sprocket 70 carried on the frame 10, the chain 67 then passing over the sprocket 71 fixed on the screw conveyor shaft 25. A second chain 72 operates over a sprocket 73 fixed coaxially with the sprocket 68 and engages over a sprocket 74 fixed to the screw conveyor shaft 26. Thus, the screw conveyors 23 and 24 are positively driven at slower speed in opposite direction to each other, but in the same direction as the blower rotors 34.

In operation: Power is applied to rotate the brushes

38—39, the conveyors 23—24, and the blowers 34 as described and the tractor 13 is driven in the direction indicated by the arrow 75 in Fig. 1 along a row of cotton plants 51 so as to successively present the plants in the slot 52 between the brushes as the tractor moves forward. Under these conditions each plant is subjected to an upward brushing action at each side of the plant and beginning at the bottom of the plant and progressing upwardly to the top of the plant to thus complete the removal of the cotton from the plant. Cotton is discharged from the brushes during their rotation and with the assistance of the stripper edges 47 into conveyor troughs 19. The screw conveyors 23 and 24 therein convey the cotton rearwardly along the rods 22 of the open sections 21 of the trough so that the trash, stones, twigs, leaves, etc. drop out on the ground and are thus separated from the cotton which is finally conveyed to the suction openings 36 and then picked up by the blower rotors 34 and discharged through the pipes 37 to the usual discharge receptacle.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

Having thus fully set forth and described this invention what is claimed and desired to be obtained by United States Letters Patent is:

1. In a cotton stripper: a frame, a pair of oppositely rotatable, elongated, rotary brush strippers on the frame, disposed one alongside the other lengthwise thereof and sloping downwardly and forwardly, with a space between them to receive cotton plants to be stripped, the forward ends of the strippers extending to only a very short distance above the ground, a pair of conveyors, one along the outside of each stripper, wall means adjacent to the strippers and conveyors to confine cotton discharged from the strippers to delivery to the conveyors, the forward ends of the conveyors being disposed closely adjacent to and laterally of the forward ends of the strippers, with the front of the conveyors having their cotton receiving surfaces below the tops of the strippers, means adjacent the forward end of each stripper, having a cotton stripping edge closely adjacent the surface of the stripper, the edge extending from beside the front end of the stripper above the middle thereof and above the cotton receiving surfaces of the stripper, backwardly and downwardly with respect thereto, so as to cause the cotton from the stripper to be removed therefrom and directed toward the conveyor above the cotton-conveying surface thereof.

2. The combination of claim 1, wherein the conveyors extend in a substantially horizontal direction, and the strippers rise at an acute angle to the conveyors.

3. In a cotton stripper: a frame, a pair of oppositely rotatable, elongated rotary brush strippers on the frame, disposed lengthwise thereof and sloping downwardly and forwardly, with a space between them to receive cotton plants to be stripped, the forward ends of the strippers extending to only a very short distance above the ground, a pair of conveyors, one along the outside of each stripper, wall means adjacent to the strippers and conveyors to confine cotton discharged from the strippers to delivery to the conveyors, the forward ends of the conveyors being disposed closely adjacent to and laterally of the forward ends of the strippers, an additional conveying means adjacent to and adapted to receive material from the rear of the conveyors previously mentioned, all said conveyors and conveying means constituting a cotton stream producing means into which the stripped cotton is delivered by the strippers and from which the stripped cotton may be withdrawn into containers or the like, the additional conveying means comprising an elevator; means to support the strippers, conveyors, and additional conveying means as a unit on the frame, including a swivel support therefor, so that the elevation of the forward end of the strippers may be adjusted and the additional conveying means will move with the other conveyors during adjustment.

4. The combination of claim 1 wherein the cotton stripping edge is of helical shape.

References Cited in the file of this patent
UNITED STATES PATENTS

| | | |
|---|---|---|
| 1,722,747 | Hentz | July 30, 1929 |
| 1,938,264 | Templeton | Dec. 5, 1933 |
| 2,406,058 | Boone | Aug. 20, 1946 |
| 2,503,416 | Russell | Apr. 11, 1950 |
| 2,673,438 | Miller et al. | Mar. 30, 1954 |
| 2,677,226 | Hyman | May 4, 1954 |
| 2,691,861 | Locke et al. | Oct. 19, 1954 |
| 2,825,197 | Smith | Mar. 4, 1958 |